United States Patent [19]

Ball et al.

[11] Patent Number: 4,672,608
[45] Date of Patent: Jun. 9, 1987

[54] MULTIPLE ACCESS COMMUNICATIONS SYSTEM

[75] Inventors: Diana M. Ball, Farnham; Peter J. Mabey, Cambridge; Paul J. Stein, Crawley, all of England

[73] Assignee: U.S. Philips Corporation, New York, N.Y.

[21] Appl. No.: 769,282

[22] Filed: Aug. 26, 1985

[30] Foreign Application Priority Data

Sep. 26, 1984 [GB] United Kingdom ............... 8424297

[51] Int. Cl.$^4$ .............................................. H04J 3/24
[52] U.S. Cl. ...................................... 370/93; 370/82; 370/85
[58] Field of Search .................. 370/93, 94, 94 U, 85, 370/104, 82

[56] References Cited

U.S. PATENT DOCUMENTS 4,398,289 8/1983 Schoute ................................. 370/93
4,504,946 3/1985 Raychaudhuri ..................... 370/104
4,528,663 7/1985 Citta ..................................... 370/94

Primary Examiner—Douglas W. Olms
Assistant Examiner—M. Huseman
Attorney, Agent, or Firm—Thomas A. Briody; Jack Oisher; William J. Streeter

[57] ABSTRACT

A method by which substations in a multiple access communication system, such as a mobile radio system, may access the base station. Access is determined by the base station in accordance with any of a plurality of operating modes during successive message time frames, the particular mode being determined by the base station from an estimate of prevailing traffic conditions. The selected operating mode during any frame is signified by a code and parameters transmitted by the base station in an Aloha invitation message which establishes such mode and the dynamic operation of the substations in that mode. The operating modes include a light traffic mode, a dynamic frame-length mode, a hybrid mode in which subsets of the population of the substations are formed, and a polling mode.

8 Claims, 14 Drawing Figures

MULTIPLE ACCESS COMMUNICATIONS SYSTEM

BACKGROUND OF THE INVENTION

1. Field of the Invention

The present invention relates to a multiple-access communications system which has particular, but not exclusive, applications in mobile radio dynamic channel assignment systems, local area networks (LANS) and satellite links. For convenience of description, the invention will be described with reference to mobile radio dynamic channel assignment (trunking) systems but it is to be understood that the same methods apply to other multiple-access communications systems.

2. Description of the Prior Art

Trunking systems are characterised by the problems of many users attempting to gain access to them at the same time. These attempts for access (which can be thought of as requests for service) can clash and be mutilated and in the absence of any form of control can produce an unstable situation where the number of requests for service which are mutilated increases, resulting in an increase in the number of requests which are retransmitted which, in turn, leads to further mutilation and ultimately results in a complete blockage of the system. The requests for service are transmitted to a central system control computer, hereinafter referred to as a system controller, via a signalling channel and the system controller allocates the speech channels according to some predetermined criteria. In the simplest case of a single channel system then the single channel has to be used for signalling and speech.

In order to mitigate these problems of clashing, controlled multi-access protocols are used to discipline users trying to gain access. Also the throughput, that is the number of successfully serviced requests per unit time, of the system can be increased.

N. Abramson "The Aloha System—Another Alternative for Computer Communications" AFIPS Conference Proceedings 1970 Fall Joint Computer Conference, 37, 281–285 proposed one of the first multi-access protocols termed "Pure Aloha". With this protocol, users transmit a request and wait for some form of acknowledgement of their request from the system controller; if no acknowledgement is heard users wait a random time before re-trying.

The throughput of "Pure Aloha" was doubled by a modified protocol, termed "Slotted Aloha", which allows users to transmit requests only within discrete timeslots, each request occupying one time slot. In spite of this improved throughput, "Slotted Aloha" nevertheless has practical disadvantages for example instability during busy periods.

With the objective of overcoming these disadvantages, "Slotted Aloha" was extended by a protocol, termed "Framed Aloha", which is disclosed in British Patent Specification No. 2063011A. In Framed Aloha a synchronisation invitation message, termed "Aloha Now", is transmitted by the system controller on the signalling channel at intervals indicating that the immediately following n time slots are available for users to transmit requests (either new requests or re-transmissions after unsuccessful requests) to the system controller via the signalling channel. The number of time slots n is a constant determined at the system design stage. With this protocol the requests are contained within known time frames, simplifying the system control strategy. However a drawback to having a fixed number n of time slots is that it does not take into account the variation in the number of requests between a quiet period and a busy period and this can result in unnecessarily long message delays during quiet periods and instability during busy periods.

An attempt to match the number of time slots available with the number of requests is disclosed in British Patent Specification No. 2069799B and in the corresponding U.S. Pat. No. 4,398,289, issued Aug. 9, 1983, and is termed "Dynamic Frame Length Aloha" (DFLA). This protocol includes means for dynamically controlling the frame-length, that is updating the number n of time slots on a frame-by-frame basis. The number n is calculated by observing the events in the previous frame such as the number of garbled (or clashed), empty and successful slots and from an estimate of the call arrival rate. By using feedback control in this way stability can be achieved under many operating conditions and additionally the access time (the time delay between a user wishing to make a request, and the request being acknowledged) is reduced. However this form of DFLA can only be stable provided the frame-length can be increased indefinitely to cope with very heavy demands for requests for service. In practice this is not possible because the Aloha message contains only a finite number of data bits to specify the different frame-lengths and therefore it follows that the throughput of DFLA can be low under heavy traffic loading. In addition there are circumstances where very long frames are undesirable. In the opposie situation under light traffic DFLA has the disadvantage that in order to minimise access times the central base station transmitter normally transmits continuously. This increases the likelihood of interference to other radio systems and also may reduce the working life of the transmitter.

Another approach to provide stability under conditions of heavy traffic is disclosed by John I. Capetanakis in "Tree Algorithms for Packet Broadcast Channels", IEEE Transactions on Information Theory, Vol. II-25, No. 5, September 1979 pages 505 to 515. In the tree algorithm, a tree comprises a root node from which a pair of branches extend. Each of the said branches divides into two at respective nodes and subsequent divisions by two take place at further nodes until one reaches the situation of a pair of sources being connected by respective minor branches to an associated node. In an example given, each of the branches from the root node are treated as two rooted subtrees. Signalling is carried out in pairs of slots, wherein each said slot has a width equal to a packet which is formed by a fixed length block of digital data. In operation each of the rooted subtrees is invited to send in requests for service in its respective slot of the pair of slots. If a collision/-garbling is detected then the system resolves the contention before issuing another general invitation for service. When resolving contentions, one of the two rooted subtrees is considered and the contention(s) is (or are) resolved before the other of the rooted subtrees is considered. The disadvantages of this type of tree algorithm are that an algorithm which deals sequentially with distinct sub-trees may be too complex for practical implementation. Further if at one node there are two requests for service, one much stronger than the other, the weaker one may be overlooked due to capturing of an FM channel. Finally by allowing only one slot for reply then if there is contention, a further division or subset has to be considered and in consequence time is lost through additional signalling.

SUMMARY OF THE INVENTION

An object of the present invention is to provide a multiple-access communications system which is adaptable to different traffic conditions.

According to one aspect of the present invention there is provided a multiple access communications system comprising a base station and a plurality of substations whose mode of operation is determined in response to an op-code transmitted in an Aloha invitation message, the value of the op-code and thereby the particular one of a plurality of operating modes being determined in response to an estimate of the prevailing traffic conditions.

According to another aspect of the present invention there is provided a multiple access communications system comprising a base station and a plurality of substations whose mode of operation is determined in response to an op-code and parameters transmitted in an Aloha invitation message, the value of the op-code and parameters and thereby the particular one of a plurality of operating modes and the dynamic operation in that mode being determined in response to an estimate of the prevailing traffic conditions.

By being able to switch between different operating modes, the communication system in accordance with the present invention is able to adapt itself to the prevailing traffic conditions.

In particular the system is able to switch between two or more different operating modes which may include light traffic mode, dynamic framelength mode, hybrid mode in which subsets of the population of the sub-stations are formed and polling. In the light traffic mode, the base station transmitter is able to operate on a low duty cycle and send an Aloha invitation message once every five seconds for example and the substations (or mobiles) can send requests for access at randomly selected times (which may be slotted) in a frame and in the event of contention or propagation errors can retransmit requests one or more times in the same frame. Normally but not exclusively the frame duration is equal to the base station keying interval.

The dynamic frame length mode may be as disclosed in British Patent Specification No. 2069799B and the corresponding U.S. Pat. No. 4,398,289 or variations thereof.

The hybrid mode may be appropriate if the prevailing traffic conditions are such that the base station determines that continued operation in the dynamic frame length mode would lead to a decreased throughput then the values of the Aloha invitation message parameters are changed so that the population of the substations is divided into subsets and each subset is able to operate in a random access mode such as dynamic framelength. This is considered to be more efficient than operating using a tree algorithm of the type disclosed in the IEEE Transactions paper by John I. Capetanakis, cited above, because substations in a subset can select randomly the time in a frame in which to transmit their requests for access.

If the number of divisions of the population reaches a point where individual substations are being addressed then the system may adopt a polling mode in which individual substations are addressed and invited or instructed individually to make a transmission.

Thus merely by changing the value of the op-code and parameters the access protocol can make a gradual transition from random access to polling (and back again) as the traffic level increases (or decreases), thereby ensuring that system delays are minimised.

In the polling mode, the base station message may be configured so that an acknowledgement of a response of a previously polled substation becomes one of the message parameters. Previously acknowledgements either were not sent or, if they were, they comprised special messages which increased the duration of the poll cycle.

In operating modes other than polling, a substation may transmit in a time slot immediately following call initiation if said time slot is within a frame. This enables faster access than with other framing systems in which a substation has to wait for the next Aloha message before selecting a time slot in the frame randomly.

BRIEF DESCRIPTION OF THE DRAWINGS

The present invention will now be described, by way of example, with reference to the acompanying drawings, wherein.

DESCRIPTION OF THE PREFERRED EMBODIMENTS

Figure 1:
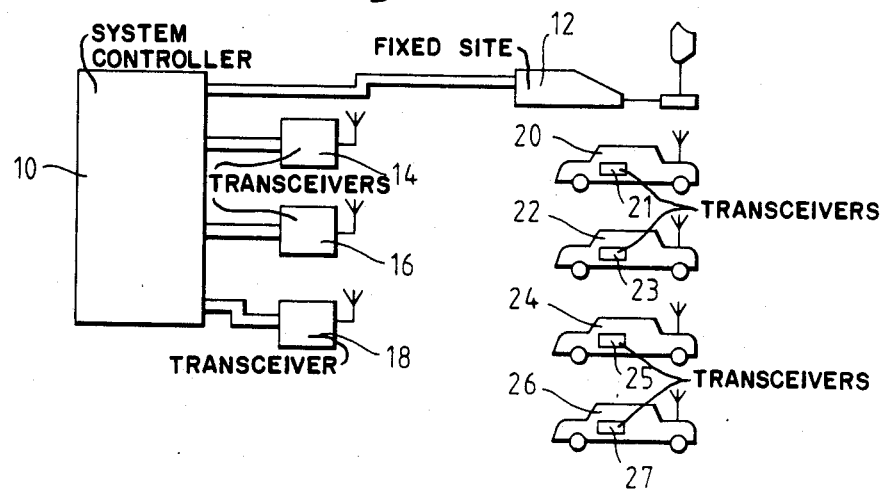
FIG. 1 illustrates in block schematic form an embodiment of a mobile radio trunking system with a single fixed site, FIG. 2A indicates the different component parts of a single message.

Referring to FIG. 1, the trunking system comprises a base station including a system controller (or central controller) 10 which is coupled by duplex or half-duplex links to a fixed position 12 and to three duplex radio transceivers 14, 16, 18. In the drawing four substations constituted by four vehicles 20, 22, 24 and 26 are shown each equipped with a radio transceiver 21, 23, 25 and 27, respectively, capable of maintaining a half-duplex link with any one of the transceivers 14, 16, 18. It is pointed out that there will be many more mobiles than the number of transceivers 14, 16, 18. Communication between mobiles is via the transceivers 14, 16, 18 controlled by the system controller 10 which comprises a computer, modulators and demodulators.

In operation most signalling between the system controller 10 and the mobiles 20, 22, 24 and 26 is done on a signalling (or control) channel, which may not be a dedicated channel. Once a call has been set up by the computer in the system controller 10 then a speech channel is allocated to the mobiles involved in the call. Calls involving mobiles can be arranged on a group or a selected mobile basis. Some signalling, for example that necessary to terminate a conversation, takes place on speech channels.

For wide area coverage, multiple fixed retransmission sites can be used. At these sites the signalling channel may be operated for example quasi-synchronously or sequentially, or a separate signalling channel may be used at each site. However for the sake of simplicity of description only a single site example will be described.

An adaptive multiple access protocol used in the system in accordance with the present invention enables the system controller to estimate the message traffic loading and to adopt an operating mode which is regarded as the most suitable at that instant. A system of the type disclosed in British Patent Specification No. 2069799B may be used to monitor the number of garbled, successful and empty slots in each frame and the call arrival rate so that the system controller can determine, by means of feedback, its mode of operation in the next frame. The mode of operation is signalled to the mobiles by the content of the message.

Figure 2A:
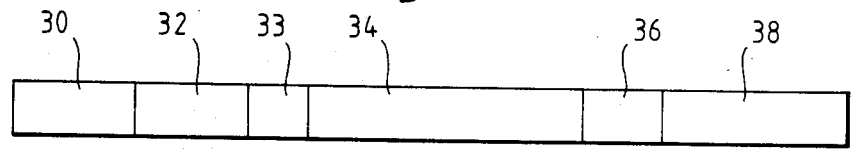
FIGS. 2B to 2D show the three different forms of the parameter section of the invitation message, corresponding to different operating modes selected by the system controller.

The central controller invites mobiles to transmit messages (requests for service) by broadcasting an Aloha invitation message. The message contains (A) a preamble 30 (FIG. 2A) of bit reversals, viz 101010 . . . , which is required to ensure that the data modems in the mobiles acquire bit synchronisation; (B) a 16 bit synchronisation word 32 which is used to give framing to the information content of the message; (C) a 4 bit op-code 33 which defines the meaning of the message; (D) a section 34 made up of parameters and data which will be discussed in detail later; (E) a 16 bit cyclic redundance check 36 which is used for error detection and/or correction; and (F) a postamble 38 comprising a sequence of random bits and/or bit reversals which normally is only transmitted by a data modem operating on the signalling (or control) channel and is an idle condition filler if the transmitter remains switched on until the next message is transmitted. All signalling in the system is transmitted as a binary data stream using for example fast frequency shift keying (FFSK) at 1200 bits per second, a binary "1" being 1200Hz and a binary "0" being 1800Hz.

In the following description of the access protocol it is convenient to consider the system as operating in four modes, namely, Light Traffic Mode (LTM), Dynamic Frame Length Mode (DFM), Hybrid Mode (HM) and Polling Mode (PM). It is possible for some combinations of these modes to be used simultaneously for different parts of user population. Each mobile will normally include a preprogrammed microcomputer having a store which retains the message from the system controller whilst operating on it to determine if the message is addressed to it.

Figure 2B:
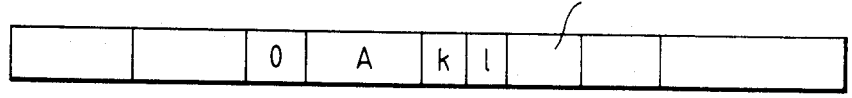
Figure 2C:
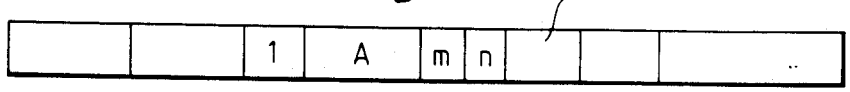
Figure 2D:
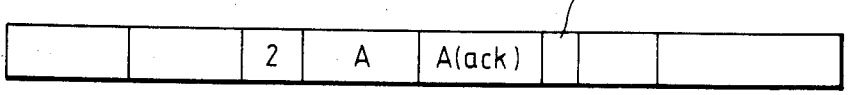

The different structures of the parameter section 34 in the invitation message used in the different modes are shown in FIGS. 2B to 2D. The different structures are distinguished by the value of the op-code 33. The parameter A is an address formed by fourteen binary digits and specifies the mobiles who are invited to transmit messages. It may be an individual mobile address, a specific group address, or it may be used to specify a subset of the mobile population. The data field 39 (FIGS. 2B to 2D) contains additional information which is not important to the current invention. The other parameters in FIGS. 2B to 2D will be defined in the following detailed description of the various operating modes.

Figure 3:
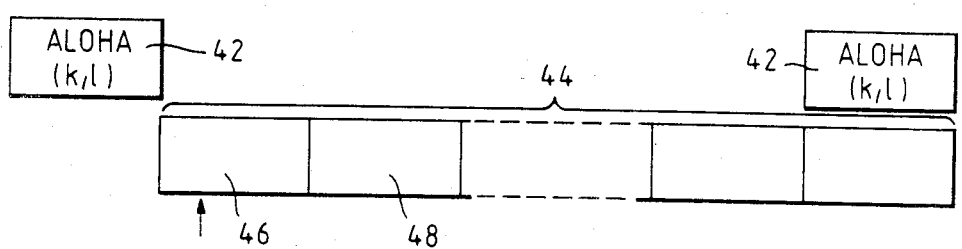
FIG. 3 indicates the signalling between the system controller and the mobiles in a light traffic mode.

LTM (FIG. 3) is used when there are few requests for service. In this mode the system controller 10 keys the base station transmitter for the signalling channel, that is one of the transceivers 14, 16, 18 (FIG. 1), periodically to transmit an Aloha message 42 with op code=0 (FIG. 2B), say once every five seconds. In this message 1 defines a frame of time slots which is available for mobile access. Normally the frame length is equal to the keying period, but it may be shorter. If a mobile wants to transmit a message whilst an LTM frame 44 is in progress, for example at a time denoted by the arrow 46, and the next following slot is within an LTM frame then it may do so in the next following slot 48. If when a mobile wishes to transmit a message no frame is currently designated then it has to wait for an Aloha message and then choose a slot randomly from among the next following k slots, k being less than or equal to the frame length. Unlike the other modes to be discussed, a mobile wishing to make a repeat transmission, due either to channel errors or garbling by another transmission, can do so by choosing a slot randomly from among the next k slots following the slot in which an acknowledgement from the system controller was expected. In fact a mobile can make several transmission attempts within one frame. Note however that if the chosen slot is outside an LTM frame, the mobile must refrain from transmitting and instead wait for another Aloha message and choose again. In LTM the base station transmitter has a low duty cycle which helps preserve it and reduces the likelihood of interference to other radio systems. The system controller 10 monitors the traffic and if appropriate it may terminate the LTM at any time, even during a frame, and enter another mode, normally the DFM, by transmitting an Aloha message with the appropriate op code. Conversely the system controller 10 can enter LTM from other modes by transmitting an Aloha message with the op code=0.

The DFM and HM modes are both designated by the Aloha message with the op code=1 (FIG. 2C).

The parameter m comprises four binary digits and is used to divide the mobile population into $2^m$ subsets. It is convenient to regard the parameter m as an instruction to the mobile to compare the m least significant bits of its individual address with the m least significant bits of the address A, and the mobile is allowed to transmit a message in response to the invitation only if the m bits match. As examples:

If m=0 then no address bits are compared and so any mobile may respond; in this case the address field A is of no significance and could be used to convey data.

If m=1 then only the least significant bit (LSB) of the address A has to be compared with the least significant bit of the mobile address and in so doing one creates two subsets each having half the population of mobile addresses.

If m=2 then the two LSBs have to be compared so creating four subsets.

This process of sub-division continues up to m=13.

If m=14 then all fourteen bits of the addresses have to be compared and this indicates that the invitation is being given to only one mobile or a specified group of mobiles.

m=14 is a special case in which the mobile compares address A with each of its designated addresses to merely its individual address (each mobile may be designated several addresses, for example one individual and various group addresses).

The parameter n, which comprises four binary digits, indicates the frame length which is the number of the next following time slots from which a mobile may choose randomly in which to transmit its message. For simplicity the following description will refer to n as the number of slots in the frame. However the value of n need not relate explicitly to the number of slots but may in fact comprise the address in a look-up table from which the explicit number of slots can be derived. (Similarly, the value of k and l may address look up tables).

The DFM is based on the method disclosed in British Patent Specification No. 2069799B and the corresponding U.S. Pat. No. 4,398,289, details of which are incorporated by reference to the latter patent. Briefly though, in the DFM the system controller arranges for an Aloha message to be transmitted, in which the op code=1, m=0 and in which the value of n is determined on the basis of the number of empty, unmutilated and mutilated time slots in the history of the frames and the estimated new request arrival rate. The system controller 10 can adaptively control the frame-length as the traffic level fluctuates in order to prevent excessive garbling and to minimise delays. In the event of a contention occurring, repeat messages cannot be transmitted in the same frame thus preventing repeat messages from converging at the end of a frame.

An algorithm which may be used for calculating by feedback control the number n of time slots in each frame comprises:

(a) keep an estimate $R$, of the current new request arrival rate per time slot;

(b) calculate $n_g$, $n_s$ and $n_e$: the numbers of inbound time slots in the previous frame observed as garbled ($n_g$), successful ($n_s$) and empty ($n_e$);

(c) set K as the number of slots since (and including) the final slot of the previous frame;

(d) set $y = g \times n_g + s \times n_s + e \times n_e + R \times K$ where g, s and e are suitably chosen constants taking into account the propagation conditions;

(e) set the required Aloha number to $n = max(1, \text{round } (y/(1-R)))$ where max (a,b) represents the maximum of a and b and round (.) represents rounding to the nearest integer.

The algorithm given above assumes that a new Aloha invitation will not be sent until after the end of the previous frame and that all slots within an Aloha frame are available for random access requests. System efficiency could be improved by allowing the transmission of a new Aloha invitation in the slot concurrent with the final slot of the previous frame and/or by allowing the reservation of some slots within an Aloha frame for messages from individual users specified by the system controller; in these cases a modified algorithm would be used.

Should the requests for service become excessive such that the maximum desirable framelength is reached and yet throughput is decreasing then the access protocol makes a transition from DFM to HM by changing the value of m from zero to a value between 1 and 14 and thereby creating subsets. HM with m=14 can also be used to invite requests from a specified user group.

H.M. may for convenience of understanding be regarded as a form of tree algorithm. However in the system in accordance with the present invention contentions can be resolved more efficiently than proposed in the cited article by John I. Capetanakis. Each of the subsets formed by making m have a value between 1 and 14 is invited in turn to transmit messages at random intervals in a frame having n time slots. For each subset the DFM algorithm is used to set the optimum value for n. However if the optimum frame length for a subset exceeds the maximum value of n, then m may be increased. In this way, the population of mobiles can be progressively subdivided and an optimum value for n maintained until with m=14 ($2^{14}$ subsets), individual mobiles can be addressed, which corresponds to pure polling, which will be discussed later.

Figure 4A:
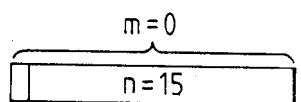
FIGS. 4A to 4D illustrates a symmetrical formation of subsets in the hybrid mode.
Figure 4B:
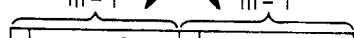
Figure 4C:
Figure 4D:
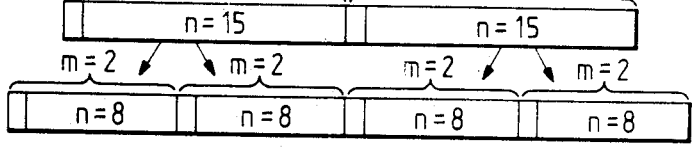
Figure 5A:
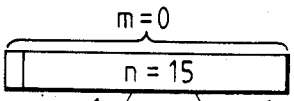
FIGS. 5A to 5D illustrates an asymmetrical formation of subsets in the hybrid mode.
Figure 5B:
Figure 5C:
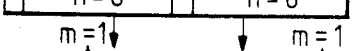
Figure 5D:
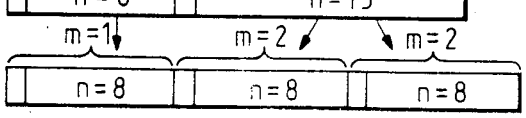

Reverting to the HM mode, FIGS. 4B to 4D illustrate the creation of subsets as the prevailing traffic level increases starting with DFM in FIG. 4A. When the DFM frame length reaches its maximum value n=15, two subsets are formed with m=1, each subset having for example eight slots (n=8), (FIG. 4B). With increasing traffic, the framelength continues to increase until beyond n=15 with m=1 (FIG. 4C) we further subdivide with m=2 so that four shorter frames with n=8 are formed (FIG. 4D) and so on. If the population of mobiles making requests for access is evenly distributed then the symmetrical subdivision shown in FIGS. 4A to 4D is appropriate. However if the population of mobiles making requests for access are not evenly distributed then it may happen that only one of the two subsets need be subdivided for example as shown in FIGS. 5A to 5D. Thus the system controller in response to the recent history of empty, mutilated and unmutilated slots and call arrival rate can vary the value of m and n to obtain optimal performance in the time domain.

Polling can be performed by using the invitation message with op-code=1 and with m=14 ($2^{14}$ subsets as above). However by adapting the message parameters the time overheads in signalling can be reduced by the system controller arranging each message word to address one mobile whilst acknowledging the response from a previously polled mobile. FIG. 2D shows the invitation message format for polling in which the op code=2 and A(ack) is the address of a previously polled mobile whose response is being acknowledged. This arrangement gives the benefit of confirming to the mobile or its operator that the poll response reached the system controller successfully, without requiring a specific acknowledgement message. Whenever no mobile is to be acknowledged by a poll message, a dummy address is used. Similarly it is possible to acknowledge, but not poll a new mobile, by using a dummy address.

By means of appropriate addressing and op codes it is possible to poll part of a fleet, whilst allowing the remainder of the fleet to operate in random access modes.

For the case of a multisite system in which a signalling channel is operated sequentially round the sites, a mobile may receive Aloha invitations from more than one site. In the DFM and HM modes, a mobile should ensure that it does not make more than one random access transmission in any one frame. Therefore, having made an unsuccessful random access request in a frame, the mobile should ignore Aloha invitations received from other sites which designate frames which overlap this frame. This can be achieved, for example, if the mobile counts slots to the end of the frame.

If it is decided to incorporate into the protocol the facility to use a non-framed mode, such as "Pure Aloha" then this can be done by providing a suitable value for the op-code 33 (FIG. 2A), say a value 3.

When implementing the present invention it is optional if all four of the operating modes are used. If desired fewer modes may be used and the op-code and parameter value are altered as appropriate.

We claim:

1. A method by which a plurality of substations in a multiple access communications system may access a base station by transmitting requests for access to the base station in time frames signified by an Aloha invitation message transmitted by the base station to the substations, such method comprising:

selection by the base station of any of a plurality of modes of operation of said system during each time frame, such selection being determined in accordance with prevailing traffic conditions in the system;

one of said modes being a dynamic frame-length mode in which there is a predetermined maximum number of time slots in each frame, and each substation transmits a request in only one time slot in any frame;

another of said modes being a hybrid mode in which the base station forms subsets of the population of substations and assigns respective dynamic frame-length modes to respective ones of said subsets;

and transmission by the base Station in the Aloha invitation message of an operating code signifying the selected mode of operation during each frame.

2. A method as claimed in claim 1, wherein the base station further transmits in said Aloha message parameters which determine the dynamic operation of said substations for the selected operating mode.

3. A method as claimed in claim 1, wherein another of said modes is a fixed frame-length mode in which there is a number of time slots in each frame.

4. A method as claimed in claim 3, wherein the base station further transmits in each Aloha message a substation address code and a code signifying the number of least significant bits in such address code which each substation compares with its address in order to determine whether it may respond to the Aloha message.

5. A method as claimed in claim 4, wherein an addressed substation responds to the Aloha message in the time slot immediately following such message if such time slot is within the same time frame.

6. A method as claimed in claim 1, wherein another of said operating modes is a polling mode in which the substations access the system in response to polling messages transmitted by the base station.

7. A method as claimed in claim 6, wherein the polling message to any substation which is polled includes an acknowledgement of a response received by the base station from a previously polled substation.

8. A method as claimed in claim 1, wherein one of said operating modes is a light traffic mode in which the base station operates on a low duty cycle and the substations retransmit a request for access in the same time frame if a previous request is mutilated in transmission.

* * * * *